United States Patent
Brummel et al.

(10) Patent No.: US 10,415,422 B2
(45) Date of Patent: Sep. 17, 2019

(54) METHOD FOR OPERATING A TURBO-MACHINE HAVING OVERLOAD PROTECTION AND TURBO-MACHINE COMPRISING A DEVICE FOR CARRYING OUT SAID METHOD

(71) Applicant: SIEMENS AKTIENGESELLSCHAFT, München (DE)

(72) Inventors: Hans-Gerd Brummel, Berlin (DE); Dirk Grieshaber, Wesel (DE); Carl Udo Maier, Stuttgart (DE); Uwe Pfeifer, Berlin (DE); Huub De Bruyn, Bm Rolde (NL)

(73) Assignee: SIEMENS AKTIENGESELLSCHAFT (DE)

( * ) Notice: Subject to any disclaimer, the term of this patent is extended or adjusted under 35 U.S.C. 154(b) by 685 days.

(21) Appl. No.: 15/024,457

(22) PCT Filed: Sep. 5, 2014

(86) PCT No.: PCT/EP2014/068893
§ 371 (c)(1),
(2) Date: Mar. 24, 2016

(87) PCT Pub. No.: WO2015/043914
PCT Pub. Date: Apr. 2, 2015

(65) Prior Publication Data
US 2016/0230591 A1    Aug. 11, 2016

(30) Foreign Application Priority Data

Sep. 30, 2013 (DE) .......... 10 2013 219 752

(51) Int. Cl.
*F01D 21/14* (2006.01)
*F01D 21/00* (2006.01)
(Continued)

(52) U.S. Cl.
CPC ............. *F01D 21/14* (2013.01); *F01D 21/00* (2013.01); *F01D 21/003* (2013.01);
(Continued)

(58) Field of Classification Search
CPC ........ F01D 21/00; F01D 21/003; F01D 21/14; F04D 27/001; F04D 29/053; G01L 3/102;
(Continued)

(56) References Cited

U.S. PATENT DOCUMENTS 5,363,317 A * 11/1994 Rice .......... B64D 31/12
701/100
7,219,564 B1 * 5/2007 May .......... G01L 3/102
73/862.333
(Continued)

FOREIGN PATENT DOCUMENTS

CN 101096916 A 1/2008
CN 101581318 A 11/2009
(Continued)

OTHER PUBLICATIONS

Chinese Office Action dated Dec. 2, 2016, Application No. 201480065389.6; 21 pgs.
(Continued)

*Primary Examiner* — Jason D Shanske
*Assistant Examiner* — Sang K Kim
(74) *Attorney, Agent, or Firm* — Schmeiser, Olsen & Watts LLP

(57) ABSTRACT

A turbo-machine is provided having at least one turbo-machine stage, wherein overload protection of the rotating shaft is provided by the method and, to protect the rotating shaft against overload, a measurement of a torsional stress of the rotating shaft is carried out during operation of the rotating shaft. The torsional stress is measured via a measurement of the torque of the rotating shaft. The torque is
(Continued)

Figure 3:
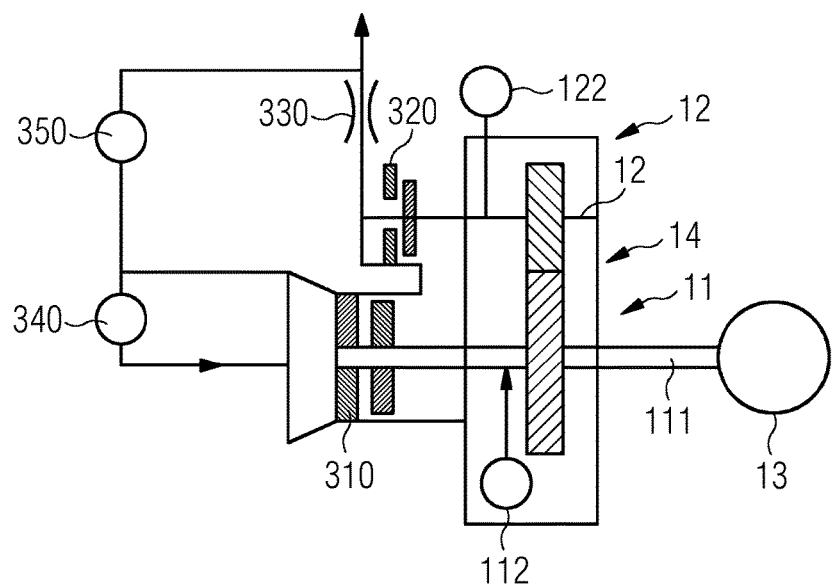

preferably measured magneto-elastically. By using the measured torque of the rotating shaft, the development of the torque is forecast. On the basis of the forecast produced, the turbo-machine stage or operating parameters of the turbo-machine is/are regulated. Further a turbo-machine is provided comprising at least one turbo-machine stage which has at least one rotating shaft, wherein the turbo-machine has a device for carrying out the method.

12 Claims, 2 Drawing Sheets

(51) Int. Cl.
  F04D 27/00      (2006.01)
  F04D 29/053     (2006.01)
  F04D 29/32      (2006.01)
  G01L 3/10       (2006.01)
(52) U.S. Cl.
  CPC ......... *F04D 27/001* (2013.01); *F04D 29/053* (2013.01); *F04D 29/32* (2013.01); *G01L 3/102* (2013.01); *F05D 2220/31* (2013.01); *F05D 2220/32* (2013.01); *F05D 2220/40* (2013.01)
(58) Field of Classification Search
  CPC ............. F05D 2220/31; F05D 2220/32; F05D 2220/40; F02C 29/26; F02C 29/28
  See application file for complete search history.

(56) References Cited

U.S. PATENT DOCUMENTS

| | | | |
|---|---|---|---|
| 2010/0161154 A1* | 6/2010 | Moeckly | F01D 21/003 701/3 |
| 2013/0098042 A1* | 4/2013 | Frealle | F01D 21/003 60/734 |
| 2015/0308347 A1* | 10/2015 | Smith | F02C 7/26 60/778 |
| 2016/0178464 A1* | 6/2016 | Burns | F02C 3/10 73/112.01 |
| 2016/0195026 A1* | 7/2016 | Sopcic | F02C 9/28 701/100 |
| 2018/0156138 A1* | 6/2018 | Elgezabal Gomez | F02C 9/28 |

FOREIGN PATENT DOCUMENTS

| | | |
|---|---|---|
| CN | 102135021 A | 7/2011 |
| EP | 2022945 A1 | 2/2009 |
| EP | 2119917 A1 | 11/2009 |
| JP | H06288787 A | 10/1994 |
| WO | WO0113082 A1 | 2/2001 |
| WO | WO 2008003095 A1 | 1/2008 |

OTHER PUBLICATIONS

International Search Report; PCT/EP2014/068893; International Filing Date: Sep. 5, 2014; 3 pgs.

* cited by examiner

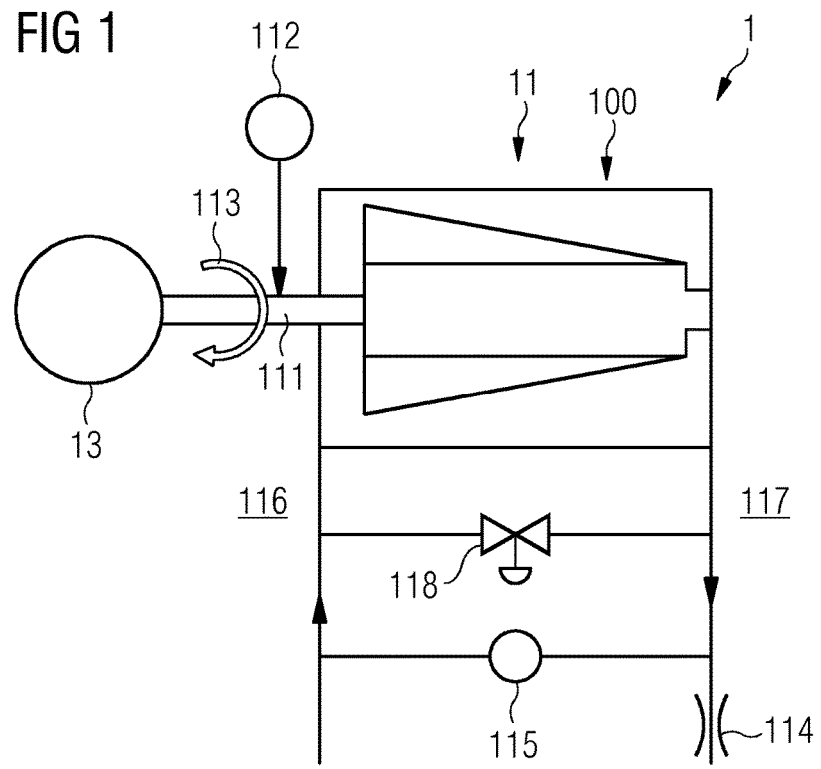
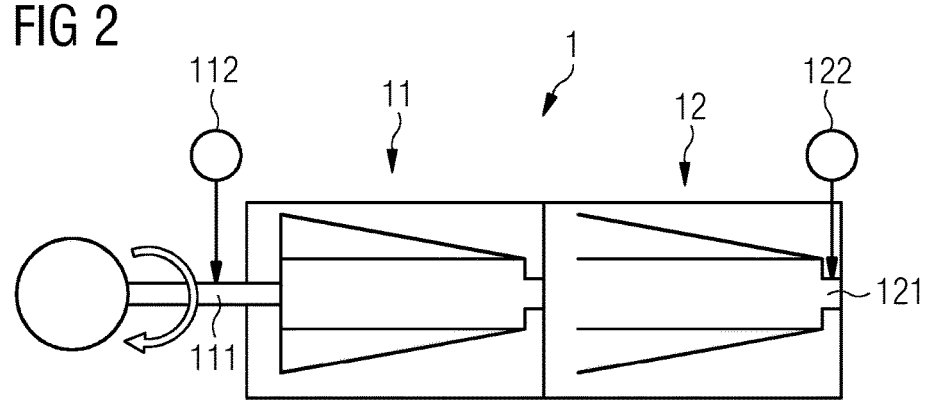

METHOD FOR OPERATING A TURBO-MACHINE HAVING OVERLOAD PROTECTION AND TURBO-MACHINE COMPRISING A DEVICE FOR CARRYING OUT SAID METHOD

CROSS-REFERENCE TO RELATED APPLICATIONS

This application claims priority to PCT Application No. PCT/EP2014/068893, having a filing date of Sep. 5, 2014, based off of DE Application No. 10 2013 219 752.7 having a filing date of Sep. 30, 2013, the entire contents of which are hereby incorporated by reference.

FIELD OF TECHNOLOGY

The following relates to a method for operating a turbomachine having overload protection. The turbomachine has at least one turbomachine stage. In addition, a turbomachine having a device for carrying out the method is specified.

BACKGROUND

In a turbomachine, energy is transferred by a flowing fluid (gas or liquid). The energy transfer takes place in this case via a rotor with a rotary shaft (driveshaft or output shaft). Arranged on the rotary shaft are rotor blades, wings or blades which are formed such that a pressure difference ($\Delta p$) arises in the fluid flow (volumetric flow rate) between the front side and the rear side of the rotor.

Currently customary overload protection mechanisms in turbomachines, for example a turbocompressor, are generally ensured via the drive of the turbomachine. An output of a motor driving the rotary shaft of the turbomachine stage is regulated or limited via the starting current thereof. Such methods are static and not very flexible.

SUMMARY

An aspect relates to a turbomachine having at least one turbomachine stage which has at least one rotary shaft, wherein the method provides overload protection for the rotary shaft, and, for the overload protection of the rotary shaft, a torsional stress in the rotary shaft during operation of the rotary shaft is sensed.

In order to achieve the aspect, also specified is a turbomachine having at least one turbomachine stage which has at least one rotary shaft, wherein the turbomachine has a device for carrying out the method. The turbomachine is for example a turbocompressor which has a plurality of compressor stages (turbomachine stages).

The method can be used for a single-stage turbomachine. The turbomachine has only one turbomachine stage. In a preferred configuration, a multistage turbomachine having at least one further turbomachine stage is used as the turbomachine, said further turbomachine stage having at least one further rotary shaft. In this case, the method provides overload protection for the further rotary shaft, and, for the overload protection of the further rotary shaft, a further torsional stress in the further rotary shaft during operation of the further rotary shaft is sensed. The turbomachine has at least one further turbomachine stage having at least one further rotary shaft. In this case, for example the rotary shaft and the further rotary shaft are identical. There is only one common rotary shaft for the turbomachine stages. For example, such a multistage turbomachine is a multistage turbocompressor.

The basic idea of embodiments of the invention is that of determining the torsional torque at the rotary shaft and/or the further torsional torque at the further rotary shaft during operation of the turbomachine. The torsional torques determined are used for the overload protection of each particular rotary shaft. In this case, each of the rotary shafts is preferably treated separately. The methods for sensing the torsional stress and for sensing the further torsional stress are carried out independently of one another.

According to one particular configuration, in order to sense the torsional stress in the rotary shaft, a torque of the rotary shaft is measured and/or, in order to sense the torsional stress in the further rotary shaft, a further torque of the further rotary shaft is measured.

In one particular configuration, for the overload protection of a rotary shaft of at least one of the turbomachine stages, the following method steps are carried out:
a) prediction of a development of the torque of the rotary shaft using the measured torque of the rotary shaft, and
b) changing of at least one operating parameter of the turbomachine stage using the prediction.

Using the measured torques, the temporal development of the torques is estimated. Thus, whether the torques exceed a permissible limit value $M_{lim}$ for each particular rotary shaft is estimated for example.

The particular torque is in this case preferably measured continuously. As a result, a temporal change in the torque can be sensed. On the basis of the sensed torque or the temporal change in the torque, the development of the torque is estimated. A prediction (forecast) for the development of the torque is established. The development of the torque is forecast or extrapolated. Whether the permissible limit value $M_{lim}$ for the torque is exceeded is estimated using the forecast. In this case, countermeasures are taken. At least one operating parameter of the turbomachine stage is changed such that the limit value $M_{lim}$ for the rotary shaft is not exceeded but is complied with.

For example, on the basis of the forecast, the volumetric flow rate of the fluid with which the turbomachine or the turbomachine stage is operated is changed. The operating parameter of the turbomachine stage is the volumetric flow rate. It is also conceivable, on the basis of the forecast, to change a rotational speed at which the rotary shaft of the turbomachine stage is operated. Thus, the turbomachine, or the turbomachine stage, could be shut down or deactivated (rotational speed 0). The operating parameter is the rotational speed of the rotary shaft of the turbomachine stage. Other operating parameters are for example a setting of the orientation of baffles for the flowing fluid.

In one particular configuration, a torque sensor for measuring the torque of the rotary shaft is arranged at the rotary shaft and/or a further torque sensor for measuring the further torque of the further rotary shaft is arranged at the further rotary shaft. The torque and further torque and optionally the temporal changes thereof can be measured independently of one another.

At least one of the torque sensors is preferably arranged directly at the particular rotary shaft. With the aid of the torque sensor, the torque at the rotary shaft is measured directly. For example, a compressor has a plurality of compressor stages where each case has one compressor housing. For each of the compressor housings, the torque is measured separately as a torque difference between the driveshaft and output shaft.

Preferably, in order to measure the torque of the rotary shaft and/or in order to measure the further torque of the further rotary shaft, a contactless measurement method is carried out. The torque sensor and/or the further torque sensor are a contactless torque sensor.

An optical measurement method for example is carried out as the contactless measurement method. Preferably, the contactless measurement method is carried out with the aid of a magnetoelastic torque sensor. The contactless torque sensor is a magnetoelastic torque sensor.

Magnetoelasticity is based on a change in the magnetic permeability of a ferroelectric material on account of mechanical forces which act on the ferromagnetic material. As a result of the use of magnetoelastic torque sensors, it is possible to measure torques directly during operation of the turbomachine.

Hitherto, directly measuring the torque at a compressor during operation was possible only with considerable effort, for example by way of strain gages attached to the rotary shaft and telemetry for transmitting the signals received from the rotating rotary shaft. As a result of the use of a precise magnetoelastic torque sensor, which has no contact whatsoever with the rotary shaft and also does not require any treatment of the rotary shaft (for example attachment of strain gages to the rotary shaft), it is possible to use the described method directly in a simple manner.

With regard to the magnetoelastic measurement principle, it is particularly advantageous to use a rotary shaft of the turbomachine stage which consists entirely of ferroelectric material. However, it is also conceivable for the rotary shaft to consist only in part of ferroelectric material. For example, a ferroelectric coating of the rotary shaft, which is connected firmly to the rotary shaft, consists of ferroelectric material. This ensures that, as a result of the connection of the ferroelectric coating and the rotary shaft, the torque of the rotary shaft can be transmitted to the ferroelectric coating. As a result of the transmission of the torque, the permeability of the ferroelectric material of the ferroelectric coating changes. This results in a detectable signal which allows conclusions to be drawn about the torque at the rotary shaft.

The described method is usable for all types of turbomachine. According to one particular configuration, the turbomachine is selected from the group consisting of gas turbine, steam turbine, turbocharger, pump, compressor and hydro turbine. Preferably, the turbomachine is a compressor, in particular a turbocompressor. A turbocompressor is understood to be both mechanically driven compressors in the oil and gas sector and combined machines for energy conversion such as gas turbines.

As a result of a high-resolution measurement of the torque or torques, overloads can be extrapolated and forecast early. This applies in particular in the case of sufficiently small temporal changes. Such a dynamic process is used to prevent the overload limit from being exceeded or overshot.

BRIEF DESCRIPTION

Figure 4:
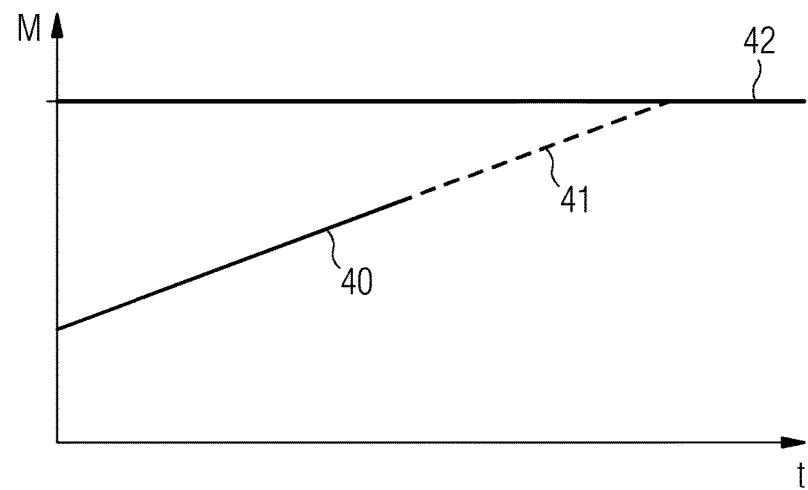

Some of the embodiments will be described in detail, with reference to the following figures, wherein like designations denote like members, wherein:

FIG. 1 shows a single-stage single-shaft compressor;
FIG. 2 shows a multistage single-shaft compressor;
FIG. 3 shows a geared compressor; and
FIG. 4 shows a forecast development of a torque using measured torques.

DETAILED DESCRIPTION

What is shown is a turbomachine 1 in the form of a turbocompressor having at least one compressor stage (turbomachine stage) 11. The compressor stage 11 has a rotary shaft 111.

Arranged at the rotary shaft 111 is a torque sensor 112 for measuring the torques of the rotary shaft. The torque sensor 112 is a magnetoelastic torque sensor.

The turbocompressor 1 has a device 100 for carrying out a method for operating the turbocompressor 1, wherein
  the method provides overload protection for the rotary shaft, and,
  for the overload protection of the rotary shaft, a torsional stress in the rotary shaft during operation of the rotary shaft is sensed.

In order to measure the torque with the aid of the magnetoelastic torque sensor 112, the rotary shaft 111 consists of ferroelectric material. In an alternative exemplary embodiment, the rotary shaft 111 has a ferroelectric coating that is connected firmly to the rotary shaft 111.

Depending on the temporal change in the torque, at least one operating parameter of the compressor stage 11 is varied. To this end, use is made of pump regulation 118. The operating parameter is the rotational speed 115 of the rotary shaft 111, which is changeable via the actuation of the motor 13, and/or the volumetric flow rate of the fluid, which is changeable via the volumetric flow rate orifice plate 114.

Example 1

The turbocompressor 1 is an (axially or radially operated) single-shaft compressor (compressor with only one rotary shaft) having only one compressor stage (FIG. 1). The front side of the compressor stage is indicated by the reference sign 116 and the rear side of the compressor stage by 117.

Example 2

In contrast to example 1, the turbocompressor 1 is a multistage single-shaft compressor (FIG. 2). The turbocompressor 1 has a turbocompressor stage 11 and at least one further turbocompressor stage 12.

The rotary shaft 111 of the compressor stage 11 and the further rotary shaft 121 of the further compressor stage 12 form a common rotary shaft.

Arranged at the further compressor stage 12 is a further magnetoelastic torque sensor 122. With the aid of the further torque sensor 122, the further torque is tapped in the region of the further rotary shaft 121.

The torque sensor 112 and the further torque sensor 122 are operated independently of one another.

Example 3

The turbocompressor 1 is a geared compressor (FIG. 3). The compressor stage 11 and the further compressor stage 12 are connected together via a gear mechanism 14. The rotary shaft 111 is driven via the motor 13. The further rotary shaft 121 is coupled to the rotary shaft 111 via the gear mechanism 14.

The torque of the rotary shaft 111 is measured via the torque sensor 112 and the further torque of the further rotary shaft 121 is measured via the further rotary torque sensor 122. The fluid to be compressed is introduced into the geared compressor and the compressed fluid is removed from the geared compressor again by the adjustable input control apparatus (ELA) 310 and the adjustable output control apparatus (ALA) 320, respectively.

Further constituent parts are a volumetric flow rate orifice plate 330 and devices for measuring the pressure differences 340 and 350 at the individual compressor stages 11 and 12.

FIG. 4 indicates how, on the basis of the measured torques 40, the ongoing development of the torque 41 can be forecast. By way of the forecast, it is possible to estimate whether, and if so when, a particular torque limit value $M_{lim}$ (42) is reached. This limit value can be an alarm value and act as a boundary signal. On the basis of the forecast of the alarm value 41 being reached, operating parameters of the turbocompressor 1, or the compressor stages thereof, would be changed such that the alarm value is not reached.

In an alternative configuration, the alarm value 41 acts as a switch-off signal: the forecast reaching of the alarm value results in the turbocompressor 1 being switched off.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for operating a turbomachine comprising:
providing at least one turbomachine stage which has at least one rotary shaft,
providing overload protection for the rotary shaft, wherein the overload protection includes sensing a torsional stress in the rotary shaft by measuring a torque of the rotary shaft using a contactless measurement method during operation of the rotary shaft, wherein the contactless measurement method utilizes at least one magnetoelastic torque sensor,
wherein the overload protection for the rotary shaft is accomplished through the following steps:
 a) predicting a development of a future torque of the rotary shaft based on the measured torque of the rotary shaft, and
 b) changing at least one operating parameter of the turbomachine stage based on the prediction.

2. The method as claimed in claim 1, wherein the predicting a future development of a torque of the rotary shaft includes determining if the predicted torque of the rotary shaft at a future time exceeds a permissible torque limit value for the rotary shaft.

3. The method as claimed in claim 2, wherein the at least one operating parameter of the turbomachine stage is changed such that the permissible torque limit value for the rotary shaft is complied with.

4. The method as claimed in claim 3, wherein the permissible torque limit value for the rotary shaft acts as an alarm such that when the predicted torque of the rotary shaft at a future time exceeds the permissible limit value, the at least one operating parameter of the turbomachine stage is changed.

5. The method as claimed in claim 1, wherein the measuring the torque of the rotary shaft is performed continuously over time.

6. The method as claimed in claim 1, further comprising:
providing a multistage turbomachine having at least one further turbomachine stage used as the turbomachine, the further turbomachine stage having at least one further rotary shaft, and
providing overload protection for the further rotary shaft, wherein the providing overload protection for the further rotary shaft includes sensing a further torsional stress in the further rotary shaft during operation of the further rotary shaft.

7. The method as claimed in claim 1, wherein the at least one operating parameter includes at least one of a volumetric flow rate at the turbomachine stage of a fluid with which the flow machine stage is operated and a torque with which the rotary shaft of the turbomachine stage is driven.

8. The method as claimed in claim 1, wherein the turbomachine is selected from the group consisting of gas turbine, steam turbine, turbocharger, pump, compressor and hydro turbine.

9. A turbomachine comprising:
at least one turbomachine stage, wherein the at least one turbomachine stage has at least one rotary shaft,
a contactless torque sensor arranged at the rotary shaft, wherein the contactless torque sensor is a magnetoelastic toque sensor, wherein the magnetoelastic toque sensor measures the torque of the rotary shaft,
wherein the turbomachine is configured to perform the method of claim 1.

10. The turbomachine as claimed in claim 9, wherein the turbomachine has at least one further turbomachine stage having at least one further rotary shaft.

11. The turbomachine as claimed in claim 10, further comprising a second contactless torque sensor arranged at the at least one further rotary shaft.

12. The turbomachine as claimed in claim 9, wherein the turbomachine is selected from the group consisting of gas turbine, steam turbine, turbocharger, pump, compressor and hydro turbine.

* * * * *